United States Patent [19]

Ito et al.

[11] Patent Number: 4,718,510
[45] Date of Patent: Jan. 12, 1988

[54] MOTOR VEHICLE WITH IMPROVED COUPLING STRUCTURE FOR SPEEDOMETER CABLE

[75] Inventors: Katsuhiko Ito; Toshio Tsuchiya, both of Saitama, Japan

[73] Assignee: Honda Giken Kogyo Kabushiki Kaisha, Tokyo, Japan

[21] Appl. No.: 869,427

[22] Filed: Jun. 2, 1986

[30] Foreign Application Priority Data

May 31, 1985 [JP] Japan ................. 60-118387
May 31, 1985 [JP] Japan ................. 60-118388

[51] Int. Cl.⁴ ............................................. F16H 37/02
[52] U.S. Cl. ................................. 180/54.1; 74/12
[58] Field of Search ............... 74/12; 180/54.1, 215, 180/226, 53.6, 53.8

[56] References Cited

U.S. PATENT DOCUMENTS

| | | | |
|---|---|---|---|
| 3,483,762 | 12/1969 | Westervelt et al. | 74/12 X |
| 3,938,395 | 2/1976 | Henecke | 74/12 |
| 4,560,365 | 12/1985 | Weaver | 74/12 X |
| 4,574,652 | 3/1986 | Shichinohe et al. | 180/215 X |
| 4,593,782 | 6/1986 | Nobusawa et al. | 180/215 X |

FOREIGN PATENT DOCUMENTS 44-22938 9/1969 Japan .
57-167884 10/1982 Japan .

*Primary Examiner*—David M. Mitchell
*Assistant Examiner*—Michael Mar
*Attorney, Agent, or Firm*—Irving M. Weiner; Joseph P. Carrier; Pamela S. Burt

[57] ABSTRACT

A motor vehicle includes at least one steerable wheel, at least one drive wheel, a frame supporting the steerable and drive wheels, a power unit assembly mounted on the frame between the steerable and drive wheels, a speedometer supported on a front portion of the frame. The power unit assembly includes a crankcase, a gear transmission case connected to the crankcase, and a gear case attached to one side wall of the gear transmission case. A crankshaft is rotatably disposed in the crankcase. An output shaft operatively coupled to the crankshaft is rotatably disposed in the gear transmission case. A pair of bevel gears meshing with each other is rotatably mounted in the gear case and operatively coupled to the output shaft. A propeller shaft is connected between one of the bevel gears and the drive wheel. A speedometer cable has one end operatively coupled to the one bevel gear and the opposite end operatively coupled to the speedometer.

7 Claims, 6 Drawing Figures

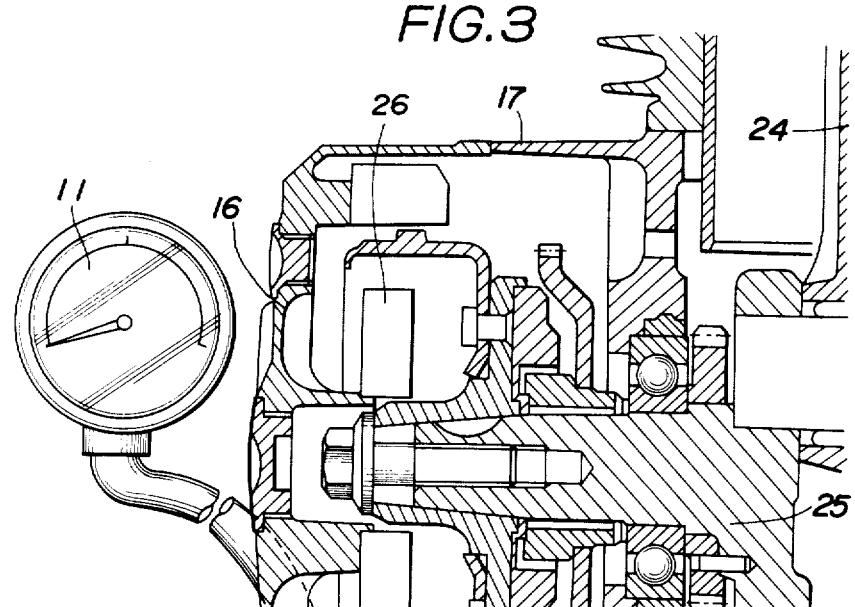
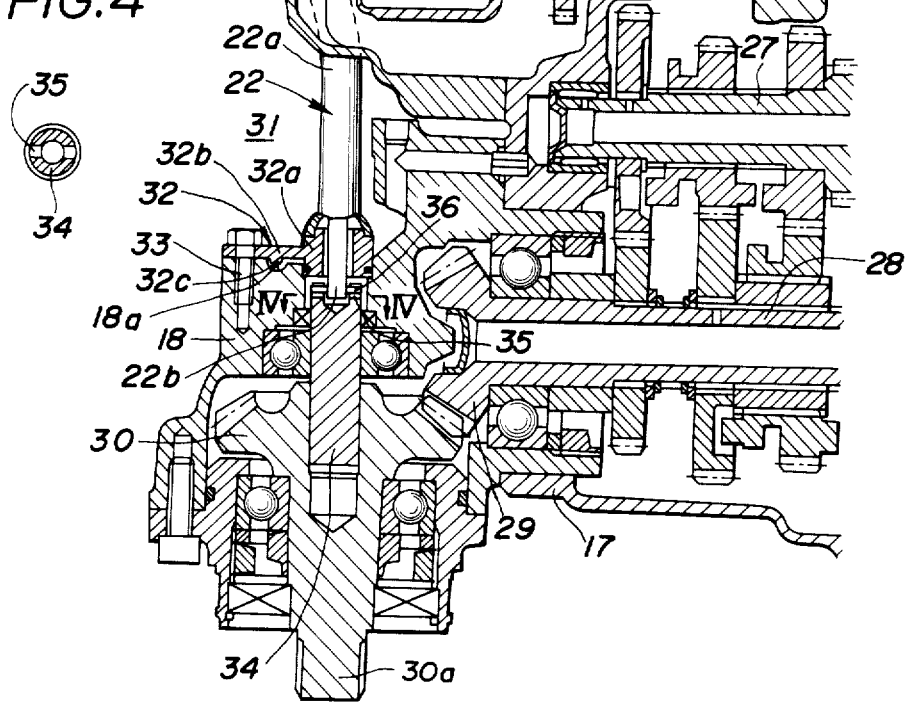

MOTOR VEHICLE WITH IMPROVED COUPLING STRUCTURE FOR SPEEDOMETER CABLE

BACKGROUND OF THE INVENTION

1. Field of the Invention

The present invention relates to a motor vehicle having an improved coupling structure for a speedometer cable.

2. Description of the Relevant Art

Speedometer cables in motor vehicles are generally coupled to gear cases mounted adjacent to axles.

For example, Japanese Utility Model Publication No. 44(1969)-22938 discloses a speedometer cable coupling construction including a gear case mounted on the hub of an axle and a worm wheel mounted in the gear case and rotatable with the axle. One end of a speedometer cable is connected to a worm wheel disposed in the gear case and held in mesh with the worm wheel. Where this cable coupling mechanism is incorporated in a four-wheel motor vehicle with front wheels driven by the engine, the speedometer cable is operatively coupled to the axle of one front wheel. However, the speedometer cable thus coupled is poor in durability since it is twisted each time the front wheel is steered. In addition, the actual layout of the speedometer cable is not easy to carry out. On four-wheel motor vehicles with engine-driven rear wheels or motorcycles, the speedometer cable is operatively coupled to the axle of the rear wheel. The problem of this speedometer cable coupling structure is that speed indication errors are large inasmuch as the cable is required to be relatively long.

Japanese Laid-Open Patent Publication No. 57 (1982)-167884 discloses a power unit assembly in which a driver bevel gear is formed on an outer end of the output shaft of a power unit or a gear transmission, and a final output shaft is mounted on one side of a power unit case and has a driven bevel gear meshing with the driver bevel gear. The final output shaft is coupled to a propeller shaft which transmits engine power to the axle of a rear wheel.

The inventors have made the present invention in order to solve the drawbacks of the conventional speedometer cable coupling mechanisms based on the power unit structure disclosed by the latter publication.

SUMMARY OF THE INVENTION

It is therefore an object of the present invention to provide a motor vehicle having an improved coupling structure for a speedometer cable, which allows the speedometer cable to be laid out relatively easily and to remain highly durable in operation.

Another object of the present invention is to provide an improved coupling structure for a speedometer cable, which reduces speed indication errors.

According to the present invention, there is provided a motor vehicle having a coupling structure for a speedometer cable, including at least one steerable wheel, at least one drive wheel, a frame supporting the steerable and drive wheels, a power unit assembly mounted on the frame between the steerable and drive wheels, a speedometer supported on a front portion of the frame, the power unit assembly including a crankcase, a gear transmission case connected to the crankcase, a gear case attached to one side wall of the gear transmission case, a crankshaft rotatably disposed in the crankcase, an output shaft rotatably disposed in the gear transmission case, a pair of bevel gears meshing with each other and rotatably mounted in the gear case, the bevel gears being operatively coupled to the output shaft, a propeller shaft connected between one of the bevel gears and the drive wheel, and a speedometer cable having one end operatively coupled to the one bevel gear and the opposite end operatively coupled to the speedometer.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a fragmentary horizontal cross-sectional view of a power unit assembly of the motor vehicle of FIG. 1;

FIG. 4 is a cross-sectional view of the front end of a connecting shaft, taken along line IV—IV of FIG. 3;

DETAILED DESCRIPTION OF THE PREFERRED EMBODIMENTS

Figure 1:
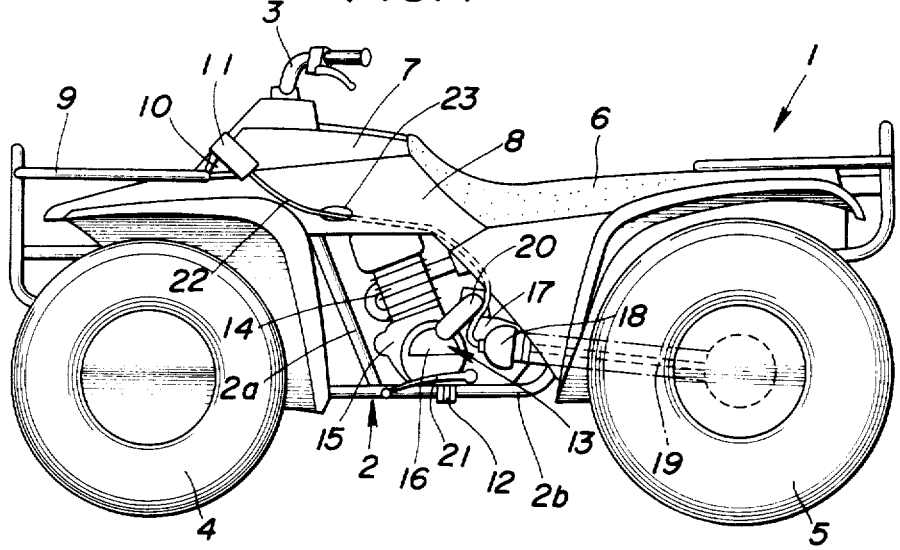
FIG. 1 is a side elevational view of a four-wheel motor vehicle with a riding saddle, which incorporates a coupling structure for a speedometer cable according to a first embodiment of the present invention.
Figure 2:
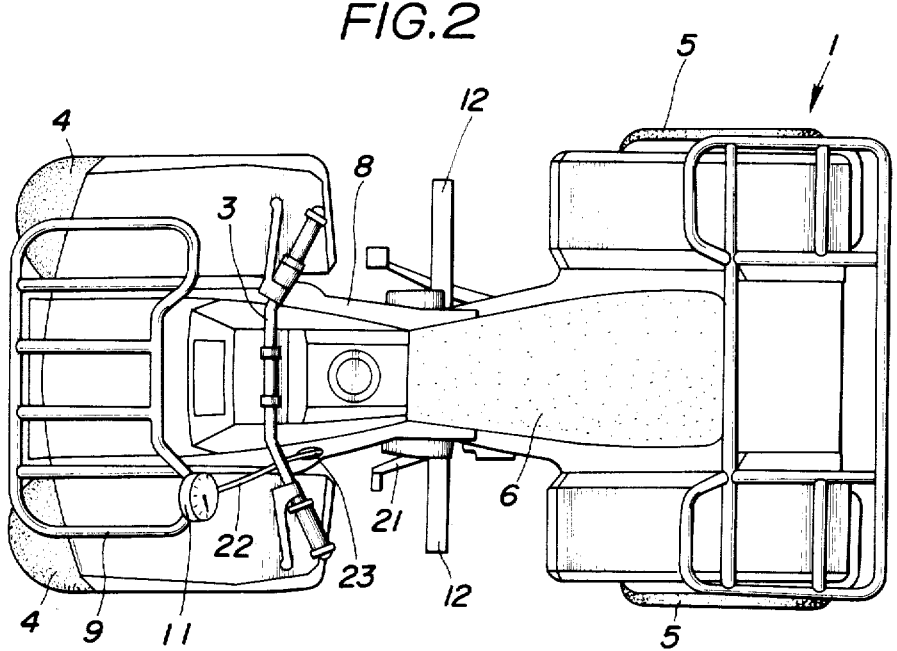
FIG. 2 is a plan view of the four-wheel motor vehicle shown in FIG 1.

As shown in FIGS. 1 and 2, a four-wheel motor vehicle 1 having a riding saddle includes a frame 2 supporting a pair of front wheels 4 on its front end which are steerable by a handlebar 3 and a pair of rear wheels 5 on its rear end. Each of the front and rear wheels 4, 5 includes a wide, low-pressure balloon tire.

The frame 2 has a vertical frame member 2a, a lower frame member 2b, and an upper frame member (not shown). A saddle 6 is mounted on the upper frame, and a fuel tank 7 is disposed in front of the saddle 6. The entire upper portion of the frame 2 is covered with a frame cover 8.

A front baggage carrier 9 is secured to the front end of the frame 2 and disposed over the front wheels 4. A speedometer 11 is mounted by a bracket 10 on one side of the rear end of the front baggage carrier 9.

A pair of foot steps 12 is attached to and project laterally from the lower frame member 2b. A power unit assembly 13 is mounted in the frame 2 in the space surrounded by the lower frame member 2b, the vertical frame member 2a, and the upper frame member. The foot steps 12 are located below the saddle 6 and the power unit assembly 13.

As shown in FIG. 1, the power unit assembly 13 is of a unitary construction including an engine 14, a crankcase 15 having a crankshaft housed therein, an ACG case 16 housing an AC generator, a gear transmission case 17 having an output shaft therein which supports a driver bevel gear, and a bevel gear case 18 housing a driven bevel gear meshing with the driver bevel gear. The driven bevel gear has its shaft coupled to a propeller shaft which drives the rear wheels 5. A starter motor 20 is mounted on the ACG case 16. A gearshift pedal 21 projects forwardly from the gear transmission case 17. A speedometer cable 22 extends from the bevel gear case 18 through the frame cover 8 out of an opening 23 defined in the frame cover 8, and is connected to the speedometer 11.

A coupling structure which operatively connects the speedometer cable 22 to the driven bevel gear in the bevel gear case 18 will be described in detail with reference to FIGS. 3 and 4.

A crankshaft 25 coupled to the connecting rod 24 of the engine 14 is rotatably supported in the crankcase 15. The crankshaft 25 has one end coupled to the AC generator 26 housed in the ACG case 16, with the opposite end coupled to a centrifugal clutch mechanism (not shown). The gear transmission case 17 also accommodates a countershaft 27 drivable by the output shaft of the centrifugal clutch mechanism and an output shaft 28 drivable by the countershaft 27 through selective gears. The output shaft 28 has one end projecting from one side wall of the gear transmission case 17. A driver bevel gear 29 is formed on the projecting end of the output shaft 28 and rotatably supported in the bevel gear case 18. The driver bevel gear 29 is held in driving mesh with a driven bevel gear 30 rotatably supported in the bevel gear case 18. The driven bevel gear 30 has a shaft 30a coupled through splines to a joint member (not shown) on the front end of the propeller shaft 19. The driver and driven bevel gears 29, 30 and the propeller shaft 19 jointly constitute a shaft drive mechanism for the rear wheels 5.

The ACG case 16 and the bevel gear case 18 are spaced from each other with a space 31 defined therebetween. A cable coupling member 32 is attached to the side wall of the bevel gear case 18 which defines the space 31. The cable coupling member 32 comprises a tubular body 32a and an arm 32b extending radially therefrom, the arm 32b being secured to the bevel gear case 18 by means of a bolt 33. The arm 32b has a positioning projection 32c fitted in a recess 18a defined in the bevel gear case 18. When attaching the cable coupling member 32 to the bevel gear case 18, the cable coupling member 32 is positioned with respect to the bevel gear case 18 by placing the positioning projection 32c in the recess 18a.

The speedometer cable 22 has an outer cable member or sheath 22a with its rear end fixedly fitted over the front end of the tubular body 32a. The speedometer cable 22 also includes an inner cable member or core 22b extending through the sheath 22a and having a rear end extending through the tubular body 32a and engaging substantially coaxially the front end of a connecting shaft 34 force-fitted in or splined to the driven bevel gear 30 in coaxial relation thereto. More specifically, the front end of the connecting shaft 34 has a diametrical groove 35, and the rear end of the inner cable member 22b has on its rear end a radial pin 36 engaging in the groove 35. The opposite end of the inner cable member 22b is coupled to the speedometer 11.

When the engine 14 is operated, the output shaft 28 is rotated thereby through the crankshaft 25 and the countershaft 27, and hence the driver and driven bevel gears 29, 30 are rotated by the output shaft 28. The inner cable member 22b connected by the connecting shaft 34 to the driven bevel gear 30 is also rotated to enable the speedometer 11 to indicate the speed of the motor vehicle which is proportional to the speed of rotation of the driven bevel gear 30.

Figure 5:
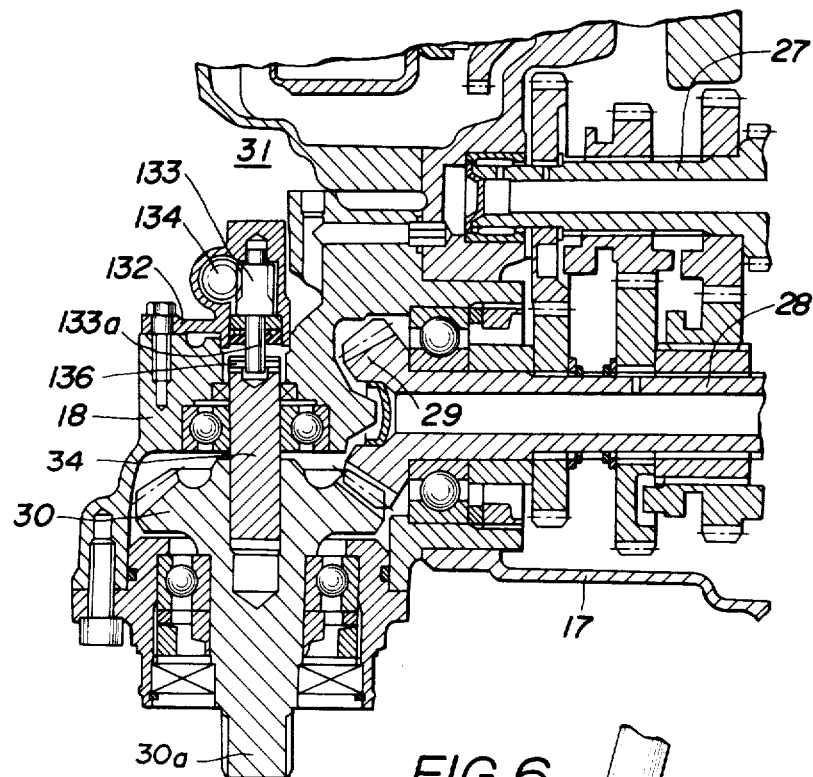
FIG. 5 is a fragmentary horizontal cross-sectional view of a power unit assembly incorporating a coupling structure for a speedometer cable according to a second embodiment of the present invention.
Figure 6:
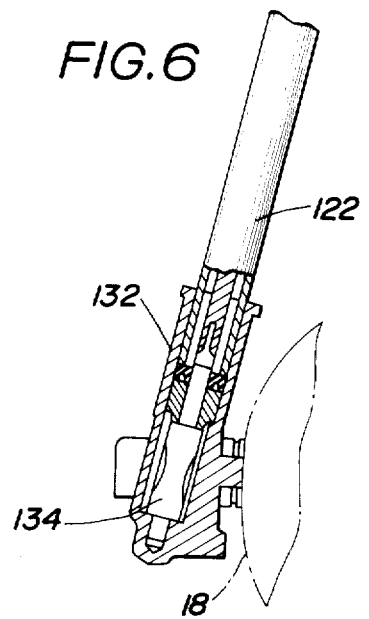
FIG. 6 is a fragmentary vertical cross-sectional view of a cable joint in the coupling structure illustrated in FIG. 5.

FIGS. 5 and 6 illustrate a coupling structure for a speedometer cable according to another embodiment. In this embodiment, a worm gear and a pinion are housed in a cable coupling member which connects a speedometer cable to a bevel gear case. Those parts in FIGS. 5 and 6 which are identical to those shown in FIGS. 3 and 4 are denoted by identical reference characters, but the different components are denoted by reference characters in 100s.

As illustrated in FIG. 5, a cable coupling member 132 is secured to the side wall of the bevel gear case 18 which defines the space 31. The cable coupling member 132 accommodates a worm gear 133 and a pinion 134 meshing therewith and having its axis inclined at an angle thereto as better shown in FIG. 6. The worm gear 133 has a shaft 133a extending substantially coaxially toward the shaft 30a of the driven bevel gear 30 and held by a pin 136 in engagement with the front end of the connecting shaft 34 force-fitted in or splined to the driven bevel gear 30. The pinion 134 has one end coupled to the end of the speedometer cable 122 which extends at an angle to the axis of the driven bevel gear 30. In operation, the driven bevel gear 30 is rotated by the driver bevel gear 29 which is rotated by the output shaft 38. The worm gear 133 coupled to the driven bevel gear 30 and the pinion 134 meshing with the worm gear 133 are also rotated to enable the speedometer cable 122 to operate the speedometer 11 so that it indicates the speed of the motor vehicle.

With the arrangement of the present invention, the speedometer cable is coupled to the power unit assembly which is positioned substantially centrally in the vehicle frame and fixed thereto. Therefore, the layout of the speedometer cable is easier to carry out than would be if the speedometer cable were coupled to the axle of a front wheel, and the speedometer cable remains durable as it is free of undesired twisting stresses. The speedometer cable can be made shorter than would be if it were coupled to the axle of a rear wheel, so that any speed indication error is smaller. The end of the speedometer cable which is coupled to the bevel gear case is protected from accidental external forces since the cable end is located in the space between the ACG case and the bevel gear case.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A motor vehicle with a coupling structure for a speedometer, comprising:

at least one steerable wheel, at least one drive wheel;

a frame supporting said steerable and drive wheels;

a power unit assembly mounted on said frame between said steerable and drive wheels, said power unit assembly including a crankcase, a gear transmission case connected to said crankcase, and a gear case attached to one side wall of said gear transmission case;

a speedometer supported on a front portion of said frame;

a crankshaft rotatably disposed in said crankcase;

an output shaft rotatably disposed in said gear transmission case;

a pair of bevel gears meshing with each other and rotatably mounted in said gear case, one of said bevel gears being operatively coupled to said output shaft;

a propeller shaft connected between the other of said bevel gears and said drive wheel; and a speedometer cable having one end operatively coupled to said other bevel gear through a connecting shaft and the opposite end operatively coupled to said speedometer said connecting shaft extending axially of said other bevel gear.

2. A motor vehicle according to claim 1, wherein said power unit assembly includes an AC generator case mounted on said crankcase on the same side as that on which said gear case is disposed, said AC generator case housing an AC generator connected to one end of said crankshaft, said one end of said speedometer cable being positioned between said AC generator case and said gear case.

3. A motor vehicle according to claim 1, including a gear train by which said one end of said speedometer cable is operatively coupled to said other bevel gear.

4. A motor vehicle according to claim 3, wherein said one end of said speedometer cable extends at an angle to the axis of said other bevel gear.

5. A motor vehicle according to claim 1, wherein said motor vehicle includes a baggage carrier disposed over said steerable wheel and supported on said frame, said speedometer being mounted on said baggage carrier.

6. A motor vehicle according to claim 1, wherein said motor vehicle has two front steerable wheels and two rear drive wheels, each of said front and rear wheels including a wide, low-pressure tire.

7. A motor vehicle with a speedometer cable coupling structure, comprising:

at least one rear drive wheel;

at least one front steerable wheel;

a frame on which said rear drive wheel and said front steerable wheel are rotatably supported;

a power unit assembly mounted on said frame between said rear drive wheel and said front steerable wheel;

a saddle disposed on an upper portion of said frame;

a handlebar mounted on a front portion of said frame and operatively coupled to said front steerable wheel for steering the same;

a speedometer mounted on the front portion of said frame;

a pair of foot steps projecting laterally from said frame below said saddle and said power unit assembly;

said power unit assembly including a crankcase accommodating a crankshaft, a gear transmission case connected to said crankcase and accommodating an output shaft, and a gear case mounted on one side wall of said gear transmission case;

a drive shaft mechanism operatively coupled between said power unit assembly and said rear drive wheel and comprising a propeller shaft connected to said rear drive wheel, and a pair of meshing bevel gears rotatably mounted in said gear case and by which said output shaft and said propeller shaft are operatively coupled to each other; and a speedometer cable having one end operatively coupled to one of said bevel gears through a connecting shaft and the opposite end to said speedometer said connecting shaft extending axially of said one bevel gear.

* * * * *

UNITED STATES PATENT AND TRADEMARK OFFICE
CERTIFICATE OF CORRECTION

PATENT NO. : 4,718,510
DATED : January 12, 1988
INVENTOR(S) : Katsuhiko Ito and Toshio Tsuchiya It is certified that error appears in the above-identified patent and that said Letters Patent is hereby corrected as shown below:

```
Column 5, line 12 (claim 1, line 25), after "speedometer"
insert a comma.
Column 6, line 33 (claim 7, line 33), after "speedometer"
insert a comma.
```

Signed and Sealed this

Twenty-first Day of June, 1988

Attest:

DONALD J. QUIGG

Attesting Officer

Commissioner of Patents and Trademarks